United States Patent [19]

Axelrod

[11] Patent Number: 4,483,953

[45] Date of Patent: Nov. 20, 1984

[54] POLYPHENYLENE ETHER RESINS AND COMPOSITIONS HEAT STABILIZED WITH TRINEOPENTYLENE DIPHOSPHITE

[75] Inventor: Robert J. Axelrod, Glenmont, N.Y.

[73] Assignee: General Electric Company, Pittsfield, Mass.

[21] Appl. No.: 531,610

[22] Filed: Sep. 12, 1983

Related U.S. Application Data

[63] Continuation of Ser. No. 315,892, Oct. 28, 1981, abandoned.

[51] Int. Cl.$^3$ ............................................. C08K 5/53
[52] U.S. Cl. .................... 524/119; 524/120; 525/132; 525/152
[58] Field of Search ............ 529/119, 120; 525/132, 525/152

[56] References Cited

U.S. PATENT DOCUMENTS

| | | |
|---|---|---|
| 2,952,701 | 9/1960 | McConnell et al. ............... 524/119 |
| 3,055,861 | 9/1962 | Hersh et al. . |
| 3,639,334 | 2/1972 | Holoch ............................ 524/147 |
| 3,737,485 | 6/1973 | Hechenbleikner ................ 524/120 |
| 4,088,709 | 5/1978 | Seymour et al. .................. 524/119 |
| 4,167,507 | 9/1979 | Haaf ................................. 525/92 |
| 4,189,411 | 2/1980 | Haaf ............................... 525/132 |
| 4,196,117 | 4/1980 | Spivack . |
| 4,312,803 | 1/1983 | Markezich et al. ............... 524/119 |
| 4,315,084 | 2/1982 | Cooper et al. ..................... 525/69 |
| 4,405,739 | 9/1983 | Kinson ............................ 524/117 |

Primary Examiner—John Kight
Assistant Examiner—Kriellion Morgan
Attorney, Agent, or Firm—Hedman, Gibson, Costigan & Hoare

[57] ABSTRACT

Polyphenylene ether resins and resin compositions in admixture with trineopentylene diphosphite as a thermal oxidative stabilizer are described. These can be used with or without an impact modifier for the polyphenylene ether resin. An additional benefit is that the resins and compositions exhibit a higher heat distortion temperature.

8 Claims, No Drawings

POLYPHENYLENE ETHER RESINS AND COMPOSITIONS HEAT STABILIZED WITH TRINEOPENTYLENE DIPHOSPHITE

This is a continuation of application Ser. No. 315,892 filed Oct. 28, 1981, now abandoned.

BACKGROUND OF THE INVENTION

The term "polyphenylene ether resin" is well known as defining a class of thermoplastic materials which possess outstanding physical properties, including hydrolytic stability, dimensional stability and excellent dielectric characteristics. Methods of preparation are known in the art and described in the patent literature, e.g., Hay, U.S. Pat. Nos. 3,306,874, and 3,306,875 and Stamatoff, U.S. Pat. Nos. 3,257,357 and 3,257,358. Other patents which show the preparation of polyphenylene ether resins include Bennett and Cooper, U.S. Pat. Nos. 3,369,656 and 3,838,102, as well as Cooper and Bennett, U.S. Pat. Nos. 3,642,699, 3,661,849 and 3,733,299.

A shortcoming of such thermoplastic materials is that they are thermally unstable at elevated temperatures considerably above room temperature, and even at lower temperatures upon prolonged exposure. As a result, the polymer can undergo oxidation and degradation when extruded or molded, as indicated by a tell-tale yellowish tinge. This imparts an unsightly appearance to the extruded or molded article and can adversely affect mechanical properties as well.

It is known that the thermal oxidative stability of polyphenylene ether resins can be improved by including certain stabilizers with the resin. One such stabilizer is diphenyl decyl phosphite. See also U.S. Pat. No. 2,952,701.

A continuing need exists for ways of improving the thermal oxidative stability of polyphenylene ether resins and compositions containing such resins.

INTRODUCTION TO THE INVENTION

The discovery has now been made that trineopentylene diphosphite (hereinafter also referred to as "TNP"), is a more effective thermal oxidative stabilizer for polyphenylene ether resins and compositions, on a weight for weight basis, than diphenyl decyl phosphite (hereinafter also "DPDP").

Trineopentylene diphosphite is also sometimes referred to as 2,2-dimethyl-1,3-propanediol bis (2,2-dimethyl-1,3-propanediol cyclic phosphite).

DESCRIPTION OF THE INVENTION

In greater detail, the polyphenylene ethers which are preferred for use in this invention are homopolymers and copolymers having the formula:

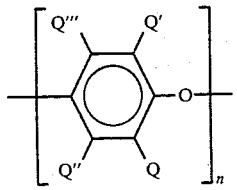

wherein Q, Q', Q" and Q''', are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atoms and the phenol nucleus, and Q', Q" and Q''' in addition may be halogen with the proviso that Q and Q' are preferably free of a tertiary carbon atom; and n represents the total number of monomer residues and is an integer of at least 50.

Especially preferred is poly(2,6-dimethyl-1,4-phenylene) ether.

The compositions of the invention can also comprise polyphenylene ether resins in admixture with alkenyl aromatic resins as defined by Cizek, U.S. Pat. No. 3,383,435, and other thermoplastic elastomers conventionally used as auxiliary or modifying resins. These are employed to improve the impact resistance of articles molded from the mixtures.

As is described in the Cizek patent, modifiers such as butadiene may be incorporated into the alkenyl aromatic resins to improve the properties of resultant compositions. Other such modifiers are also known. These include block and hydrogenated block copolymers such as are described in U.S. Pat. No. 3,660,531 of Lauchlan et al. or U.S. Pat. No. 4,167,507 of Haaf. Similarly, graft-modified polymers are described in U.S. Pat. Nos. 3,943,191; 3,959,211; 3,974,235; 4,101,503; 4,101,504; 4,104,505; and 4,102,850 of Glen D. Cooper et al. All of these modified polyalkenyl aromatic resins are also within the scope of the present invention.

Specific examples of alkenyl aromatic monomers include styrene, chlorostyrene, alpha-methylstyrene, vinyl xylene, divinylbenzene and vinyl naphthalene. Styrene is particularly preferred.

The term "styrene resin" as used broadly throughout this disclosure includes, by way of example, homopolymers such as polystyrene and polychlorostyrene, as well as polystyrenes which have been modified by natural or synthetic rubber, e.g., polybutadiene, polyisoprene, butyl rubber, EPDM rubber, ethylene propylene copolymers, natural rubber, polysulfide rubbers, polyurethane rubbers, epichlorohydrin, and the like; styrene containing copolymers such as the styrene-acrylonitrile copolymers (SAN) styrene-butadiene copolymers, styrene-maleic anhydride copolymers, styrene-acrylonitrile-butadiene terpolymers (ABS), poly-alphamethylstyrene, copolymers of ethylvinylbenzene and divinylbenzene, and the like; block copolymers of the A-B-A and A-B type wherein A is polystyrene and B is an elastomeric diene, e.g., polybutadiene, radial teleblock copolymers of styrene and a conjugated diene, acrylic resin modified styrenebutadiene resins and the like, and blends of homopolystyrene and copolymers of the aforementioned types.

The polyphenylene ether and modifying resin, e.g., polyalkenyl aromatic resin, may be present in virtually any proportion in the present blends. For optimum physical properties in the blend, however, they are preferably in a weight ratio of from about 4:1 to 1:2, respectively.

The trineopentylene diphosphite stabilizer is normally present in an amount of at least about 0.5 part per 100 parts of resin to be effective in conferring the desired thermal oxidative stability. For optimum results, amounts in the range between 0.1 and 2.0 parts based on 100 parts of resin are employed.

The molding compositions can also contain one or more of the supplementary non-resinous agents which have heretofore been customarily present in polyphenylene ether resin molding compositions to improve certain other physical and chemical properties of the moldings. These agents include flame retardants, plasticizers, strengthening fibers (for example, glass fibers and graphite whiskers), mineral fillers, abrasion resistant components, dyes, and pigments. Many of such agents are disclosed in said U.S. Pat. No. 4,172,929 to Cooper et al.

The supplementary non-resinous agents are present in total amount between about 1% and 50%, so as to provide their customary benefits.

The manner in which the present compositions are prepared is not critical. In one procedure, a blend premix is formed by tumbling the ingredients. The blend premix is passed through an extruder at an elevated temperature, e.g., from about 450° to about 600° F., dependent on the needs of the particular composition. The extrudate is cooled and chopped into pellets and the pellets are molded into any desired shape.

The following examples are given by way of illustration only and are not intended as a limitation on the scope of this invention. Unless otherwise specified herein, all proportions are provided on a weight basis.

EXAMPLE 1

A base thermoplastic molding composition was prepared by tumbling 55 parts of poly(2,6-dimethyl-1,4-phenylene ether) resin (PPO, General Electric Co.), 45 parts of a rubber modified high impact polystyrene (Foster Grant's FG 834, containing about 9% polybutadiene), 3.5 parts of tri(isopropylphenyl) phosphate flame retardant/plasticizer (FMC's Kronitex 50), 3 parts of titanium dioxide filler, 1.5 part of polyethylene, 0.15 part of zinc sulfide and 0.15 part of zinc oxide. Three samples were set aside. To one sample was added 1.0 part (based on 100 parts of total resin) of diphenyl decyl phosphite (DPDP), in accordance with the prior art. To a second sample was added 0.5 part of 2,2-dimethyl-1,3-propanediol bis (2,2-dimethyl-1,3-propanediol cyclic phosphite) (TNP), in accordance with the invention. To a third sample there was added 1.0 part of TNP, also according to the invention.

The resultant sample compositions were separately passed through an extruder at about 550° F. The extrudates were chopped into pellets and molded at an injection temperature of about 525° F. and a mold temperature of about 180° F. to product sample articles.

The molded articles were tested for their comparative physical properties, the results of which are reported in Table I.

In the Table, the abbreviations designate the following:

WI = Whiteness index
YI = Yellowness index
DTUL = Distortion Temp Under Load (°F.)
MV = Melt viscosity (1500 sec$^{-1}$, 282° C.)
UL 94 = Avg. flame out time (sec) 62 mil
Gard = Gardner impact (in. -lbs.)
Izod = Notched Izod impact (ft. lbs./in.n.)
C.F. = injection molded channel flow (in.)

TABLE I

| Sample No. | Stabilizer | (phr) | Y.I. | W.I. | DTUL | MV | UL94 | Gard. | Izod | C.F. |
|---|---|---|---|---|---|---|---|---|---|---|
| 1* | DPDP | 1.0 | 28.3 | 6.8 | 242 | 2600 | 14.2 | 150 | 3.3 | 22.5 |
| 2 | TNP | 0.5 | 27.3 | 10.0 | 253 | 2800 | 12.8 | 160 | 2.9 | 22.8 |
| 3 | TNP | 1.0 | 24.3 | 16.7 | 249 | 2700 | 12.0 | 155 | 2.8 | 22.5 |

*comparison experiment

EXAMPLE 2

The procedure of the previous example was repeated to prepare three additional molded samples which differ from those of the previous example only in that they contain 12 parts (per 100 parts of resin) of titanium dioxide and the stabilizer concentrations noted below. The actual test results are set forth in Table II, with abbreviations as explained above.

TABLE II

| Sample No. | Stabilizer | (phr) | Y.I. | W.I. | DTUL | M.V. | UL94 | Gard. | Izod |
|---|---|---|---|---|---|---|---|---|---|
| 4 | TNP | 1.0 | 17 | 38 | 255 | 2900 | 12.4 V-1 | 55 | 2.3 |
| 5* | DPDP | 1.0 | 19 | 32 | 247 | 2500 | 12.3 V-1 | 120 | 2.6 |
| 6* | DPDP | 2.0 | 17 | 38 | 244 | 2700 | 15.0 V-1 | 95 | 3.0 |

*comparison experiment

The foregoing results show that compositions in accordance with the invention, containing TNP, exhibit greater thermal oxidative stability than the comparison compositions containing DPDP on an equivalent molar phosphorus basis, as indicated by the lower yellowness index and higher whiteness index after heat aging. This effect is more pronounced at lower levels of titanium dioxide. In addition, it is seen that with use of TNP there is an increase in the ability of the compositions to withstand higher temperatures without deforming, as indicated by the higher DTUL.

All of the foregoing patents and/or publications are incorporated herein by reference. Obviously other modifications and variations of the present invention are possible in light of the above teachings. For instance, instead of poly(2,6-dimethyl-1,4-phenylene) ether, there can be used a copolymer such as poly(2,6-dimethyl-co-2,3,6-trimethyl-1,4-phenylene) ether. The compositions can also include other ingredients such as other impact modifiers, drip retardants, reinforcements and/or fillers, antioxidants, coloring agents, pigments. It is, therefore, to be understood that changes may be made in the particular embodiments of the invention described which are within the full intended scope of the invention as defined by the appended claims.

I claim:

1. A thermoplastic composition which comprises an intimate admixture of a polyphenylene ether resin with trineopentylene diphosphite in an amount effective to provide thermal oxidative stability for the resin.

2. A composition according to claim 1, wherein the trineopentylene diphosphite is present in an amount of between about 0.1 and 2.0 parts by weight based on the total amount of resin.

3. A composition according to claim 1, which additionally contains an alkenyl aromatic resin.

4. A composition according to claim 3, in which the alkenyl aromatic resin is a styrene resin.

5. A composition according to claim 4, in which the ratio of polyphenylene ether and styrene resin is from 4:1 and 1:2 respectively, on a weight basis.

6. A composition according to claim 4, in which the polyphenylene ether is poly(2,6-dimethyl-1,4-phenylene ether).

7. A composition according to claim 4, in which the styrene resin is a rubber modified high impact polystyrene.

8. A composition according to claim 1, which also contains one or more additives selected from among flame retardants, plasticizers, fillers, reinforcements, and coloring agents.

* * * * *